(12) United States Patent
Tokunaga (10) Patent No.: US 7,361,244 B2
(45) Date of Patent: Apr. 22, 2008

(54) METHOD AND DRUM FOR MOLDING TIRE

(75) Inventor: Toshio Tokunaga, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 287 days.

(21) Appl. No.: 10/516,691

(22) PCT Filed: Jun. 5, 2003

(86) PCT No.: PCT/JP03/07153

§ 371 (c)(1),
(2), (4) Date: Jun. 13, 2005

(87) PCT Pub. No.: WO03/103935

PCT Pub. Date: Dec. 18, 2003

(65) Prior Publication Data

US 2005/0274449 A1    Dec. 15, 2005

(30) Foreign Application Priority Data

Jun. 5, 2002    (JP) .............................. 2002-164430

(51) Int. Cl.
*B29D 30/26* (2006.01)
*B29D 30/32* (2006.01)

(52) U.S. Cl. ...................... 156/132; 156/135; 156/400; 156/401; 156/415; 156/416; 156/420

(58) Field of Classification Search ................ 156/132, 156/400–402, 415, 420, 133, 135
See application file for complete search history.

(56) References Cited

U.S. PATENT DOCUMENTS

| 3,414,446 | A |  | 12/1968 | Pearce et al. |  |
|---|---|---|---|---|---|
| 3,560,302 | A | * | 2/1971 | Missioux | ..................... 156/415 |
| 3,767,509 | A |  | 10/1973 | Gazuit |  |
| 3,833,445 | A |  | 9/1974 | Mallory et al. |  |
| 3,867,231 | A |  | 2/1975 | Casey |  |
| 5,181,982 | A | * | 1/1993 | Kumagai et al. | ........... 156/415 |

FOREIGN PATENT DOCUMENTS

| DE | 1288301 B | * | 1/1969 |
|---|---|---|---|
| EP | 0 459 728 A2 |  | 12/1991 |
| JP | 57-116630 A |  | 7/1982 |
| JP | 06-055664 A |  | 3/1994 |
| JP | 07-016949 A |  | 1/1995 |

* cited by examiner

*Primary Examiner*—Geoffrey L. Knable
(74) *Attorney, Agent, or Firm*—Sughrue Mion, PLLC (57) ABSTRACT

There are provided a method and a drum for building a tire in which residual air can be effectively removed by enhancing a pressing force of a carcass band to a bead filler in the turning of the carcass band around a bead core, wherein a cylindrical green case is arranged on an outer peripheral side of a building drum, and a central portion of the green case is expansion-deformed in a radial direction while approaching both the bead cores to each other under a restraint of the bead core through the building drum, and the green case is pressed onto an inner peripheral face of a belt-tread band, and thereafter both the end portions of the carcass band are turned around the bead cores so that the carcass band is pushed onto rigid support members disposed at an inner peripheral side of the carcass band together with the bead cores and bead fillers.

20 Claims, 5 Drawing Sheets

METHOD AND DRUM FOR MOLDING TIRE

TECHNICAL FIELD

This invention relates to a method of building a tire and a tire building drum used therefor, and particularly proposes a technique for effectively preventing residual air between a carcass and a bead filler.

BACKGROUND ART

In the building of the tire, a previously shaped green case composed mainly of a cylindrical carcass band, annular bead cores and bead fillers is arranged on an outer peripheral side of a tire building drum, and a central portion of the green case is expansion-deformed under an action of a building bladder disposed in the tire building drum while approaching both the bead cores to each other under a restraint of the bead cores by this building drum, and then the central portion of the green case is pressed onto an inner peripheral face of a belt-tread band composed mainly of a belt and a tread previously disposed on an outer peripheral side of the drum, and thereafter each end portion of the carcass band is turned around the bead core by double fold bladders disposed adjacent to each end portion of the building bladder and inward and outward in a radial direction.

In order to prevent the retaining of air between the carcass and the bead filler in the above building of the tire, it is proposed that an interior bladder is disposed inside the building bladder and the fold bladders doubly laminated inward and outward in the radial direction are diameter-expanded at a state of diameter-expanding the inner bladder to turn the each end portion of the carcass band, while the carcass band, bead filler and bead core are strongly sandwiched between the interior bladder and an outer fold bladder to remove air between the carcass and the bead filler to thereby enhance the adhesion property therebetween.

According to such a conventional technique, however, the interior bladder is made from a rubber membrane body provided with a reinforcing layer and is relatively low in the rigidity even at the diameter-expanded state, so that the pressing force of the carcass to the bead filler can not be sufficiently enhanced, and hence there is still a fear of retaining air in the bead portion. As a result, there are problems that the uniformity of the product tire may not be held at a good level and in extreme cases, the residual air causes the lowering of the durability in the bead portion.

It is, therefore, an object of the invention to provide a tire building method and a tire building drum wherein the residual air can be sufficiently removed between the carcass and the bead filler in the formation of the bead portion to keep the uniformity of the product tire at a good level and improve the durability of the bead portion.

DISCLOSURE OF THE INVENTION

The invention lies in a method of building a tire at, for example, a two-stage building in which a green case composed mainly of a cylindrical carcass band, annular bead cores and bead fillers is arranged on an outer peripheral side of a tire building drum, and a central portion of the green case is expansion-deformed in a radial direction while approaching both the bead cores to each other under a restraint of the bead cores by the tire building drum, and then the green case is pressed onto an inner peripheral face of a belt-tread band composed mainly of a belt and a tread, and thereafter each end portion of the carcass band is turned around the bead core, wherein the carcass band is pushed onto rigid support members arranged inward in an axial direction of the carcass band over a whole of an arranging region of the bead core and the bead filler together therewith in the turning of the carcass band.

Here, when the end portion of the carcass band is turned, the carcass band is pushed onto the rigid support members from an outside in the axial direction together with the bead filler and the like, and the pushing force is surely and sufficiently supported by the rigid support members having a rigidity fairly higher than that of a rubber bladder without a draft deformation or the like, so that the pressing force of the carcass band to the bead filler can be largely enhanced over the whole of the arranging region of the bead filler as compared with the conventional technique, and hence the residual air therebetween can be pushed out and removed more effectively.

Therefore, the uniformity of the product tire is improved and the durability of the bead portion is improved.

Also, the other building method according to the invention lies in a single stage building in which a cylindrical carcass band is shaped on a building drum, and bead cores and bead fillers are arranged on an outer peripheral side of the carcass band to form a green case, and a central portion of the green case is expansion-deformed in a radial direction while approaching both the bead cores to each other under a restraint of the bead core, and the green case is pressed onto an inner peripheral face of a belt-tread band composed mainly of a belt and a tread, and thereafter the carcass band is pushed onto rigid support members arranged inward in an axial direction of the carcass band over a whole of an arranging region of the bead core and the bead filler together therewith.

Even in the method of shaping the green case on the building drum, the carcass band and the bead filler are supported by a large force over the whole of the arranging region of the bead filler under the same action of the rigid support members as mentioned above, whereby the residual air therebetween can be sufficiently removed.

Furthermore, the tire building drum according to the invention comprises a building bladder having substantially a cylindrical form and capable of expanding in a radial direction, a pair of bead lock means located adjacent to end portions of the building bladder and approaching to and separating away from each other and displacing in diameter-expansion, double fold bladders located adjacent to an outside of each bead lock means and arranged inward and outward in the radial direction, and plural rigid support members arranged inside the building bladder and at a position adjacent to an inside of the bead lock means and displacing in diameter expansion and contraction in the radial direction in which these members are aligned in a peripheral direction without space in at least diameter-expanded posture and form an annular plane having a given width in the radial direction at a plane perpendicular to a center axial line of the building bladder and crossing thereto.

When the green tire is shaped by using this building drum, a previously shaped green case having a cylindrical form as a whole is arranged at the outer peripheral side of the tire building drum through a green case holding and transferring means, and then the bead core is locked by diameter-expanding the bead lock means and the building bladder is deformed through diameter-expansion while approaching the bead lock means and hence both the bead cores to each other under the restraint of the bead core, whereby the central portion of the green case is expansion-deformed in the radial direction and pressed onto an inner peripheral face of a belt-tread band previously arranged on an outer peripheral side of the building drum through a belt-tread band holding and transferring means.

Further, the plural rigid support members arranged adjacent to the inside of the bead lock means is diameter-expanded in the building bladder to position them continuously extending in an annular form at a given width in correspondence to the inside of the bead core and bead filler, and thereafter the double fold bladders arranged inward and outward in the radial direction are diameter-expanded to turn each end portion of the carcass band around the bead core, while the carcass band is pushed onto the rigid support members over a whole of an arranging region of the bead core and bead filler together therewith.

In this case, the rigid support member surely and sufficiently supports the above pushing force based on the rigidity itself without draft deformation or the like, so that the pressing force between the bead filler and the carcass can be largely enhanced as compared with the conventional technique, and hence the residual air can be removed effectively.

Therefore, the uniformity of the product tire is improved and also the durability of the bead portion is improved.

In a preferable embodiment of the invention, a width of an annular plane in a radial direction formed at a posture of diameter-expanding the plural rigid support members is made wider than lengths of the bead core and bead filler in the radial direction.

According to this embodiment, each of the bead filler and the bead core can be strongly pushed onto the rigid support members over the whole thereof, and the residual air can be removed more surely.

In another preferable embodiment, a bead receiving face at the outer peripheral face of the bead lock means in a section inclusive of a center axial line of the building bladder is rendered into a U-shaped form opening outward in the radial direction or a collar form in which a central portion side of the center axial line is large in the diameter and an end portion side thereof is small in the diameter.

According to this embodiment, when the central portion of the green case is expansion-deformed in the radial direction by approaching both the bead cores to each other, the pulling-out of the carcass band cords toward the side of the building bladder to the bead core or the falling down of the bead core toward the side of the building bladder due to tensile force applied to the carcass band can be effectively prevented by the bead receiving face based on a large restraint force directly applied to the carcass band.

In the other preferable embodiment, a portion of the fold bladder located outward in the radial direction and near to the central portion of the center axial line of the building bladder is arranged so as to protrude up to a position covering the whole of the bead receiving face.

According to this construction, the force in the diameter-expansion direction can be applied to the carcass band and the bead core accompanied with the supply of an internal pressure to the outer fold bladder in the turning of the carcass band to enhance the pressing force of the carcass band to the bead core, and hence the residual air therebetween can be effectively removed and the restraint force to the pulling-out of the cords can be enhanced.

BEST MODE FOR CARRYING OUT THE INVENTION

Figure 1:
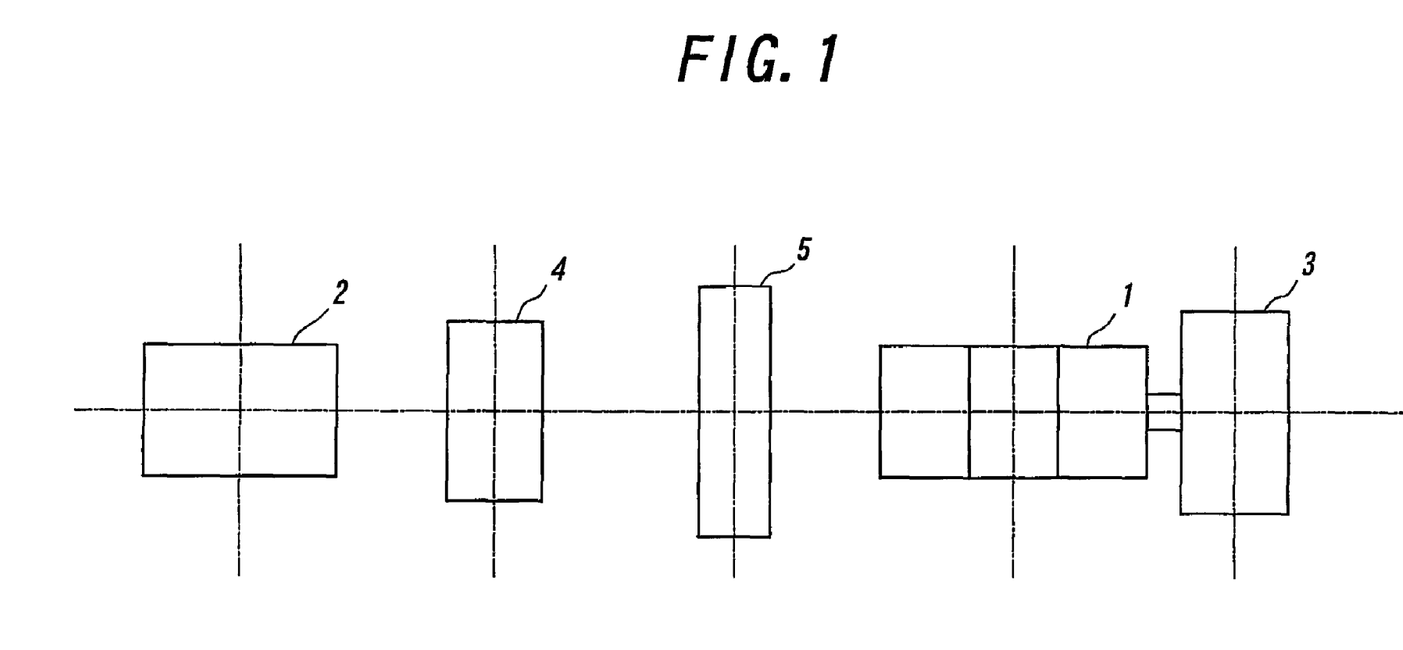
FIG. 1 is a schematically plan view illustrating a layout of a tire building installation applicable to the invention.

In FIG. 1, numeral 1 is a tire building drum aiming at the invention, and numeral 2 a band shaping drum located at a left end of the figure and forming a green case to be transferred to the building drum 1, and numeral 3 a belt-tread shaping drum located adjacent to a right side of the building drum 1 in the figure. The band shaping drum 2 is devoted to the formation of a green case composed mainly of a carcass band, bead cores and bead fillers, and the belt-tread shaping drum 3 is devoted to the formation of a belt-tread band composed mainly of a belt and a tread.

Also, numeral 4 is means for holding and transferring the green case. The green case holding and transferring means 4 functions to transfer and deliver the green case (not shown) formed on the band shaping drum 2 to the building drum 4.

Numeral 5 is means for holding and transferring the belt-tread band. The belt-tread band holding and transferring means 5 functions to transfer the belt-tread band (not shown) from the belt-tread drum 2 to an outer peripheral side position of the green case disposed on the tire building drum 1 and hold it at this position.

Figure 2:
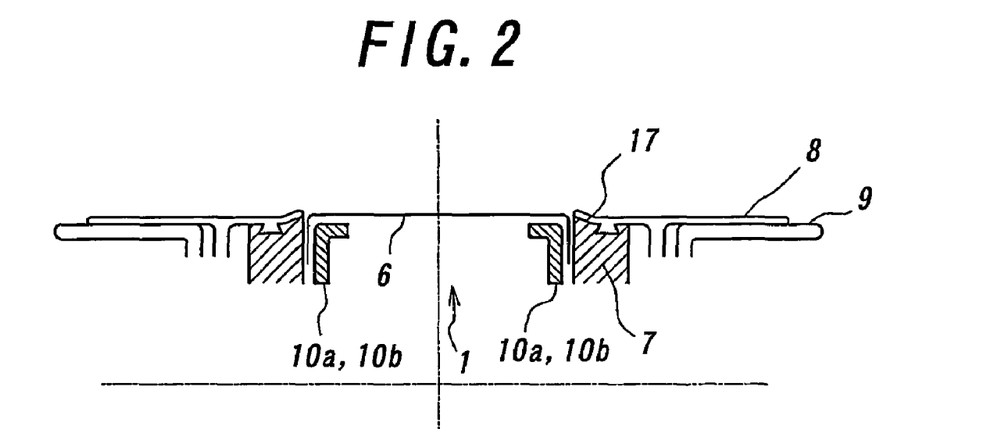
FIG. 2 is a view schematically showing a half of a tire building drum according to the invention at a section inclusive of a center axial line thereof.

In FIG. 2, numeral 6 is a building bladder having a cylindrical form at a normal state and capable of expansion-deforming in a radial direction. At positions adjacent to both end portions of the building bladder 6 are arranged bead lock means 7 each constructed by a plurality of arc-shaped elements adjoining to each other in a peripheral direction and capable of expanding and contracting in a radial direction. Also, a fold bladder 8 is arranged adjacent to an outside of the bead lock means 7 so as to locate outward in the radial direction, and a fold bladder 9 is further arranged adjacent to an outside of the fold bladder 8 so as to locate inward in the radial direction.

In an inside of the building bladder 6 are arranged a plurality of rigid support members 10a, 10b adjacent to the inside of the bead lock means 7 and capable of expanding and contracting diameter in the radial direction.

Figure 3:
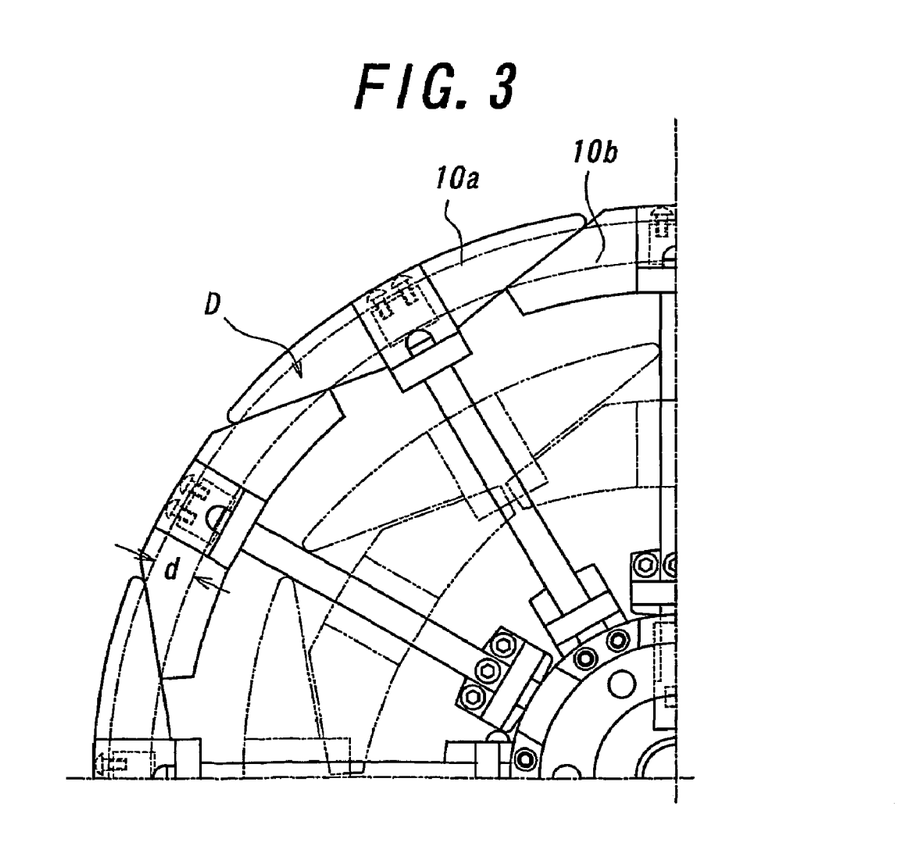
FIG. 3 is a view showing a tetartohedral form of arranging rigid support members in the tire building drum according to the invention.

FIG. 3 is a view showing a tetartohedral form of arranging these rigid support members 10a, 10b in a plane perpendicular to a center axial line of the building bladder and crossing thereto, in which a state of expanding diameter is represented by a solid line and a state of contracting diameter is represented by a phantom line.

In the illustrated embodiment, the rigid support member 10a has substantially a fan-shaped form and the other rigid support member 10b has substantially a trapezoidal form, and these rigid support members 10a, 10b are alternately arranged every 6 members at equal intervals in the peripheral direction.

In the diameter-expansion, these rigid support members 10a, 10b are alternately aligned in the peripheral direction without space to form an annular plane region D common to both the members 10a, 10b having a given width d in the radial direction and defined between dot-dash lines in the figure. The given width d is made wider than lengths of the bead core and bead filler in the radial direction as mentioned later.

On the other hand, the rigid support members 10a, 10b are displaced in the diameter-contraction as shown by the phantom line in FIG. 3, in which the trapezoidal rigid support members 10b are located inward from the fan-shaped rigid support members 10a in the radial direction and aligned at a state of adjoining them to each other in the peripheral direction, and the fan-shaped rigid support members 10a are aligned at a state of adjoining to each other at the outer peripheral side thereof.

Figure 4:
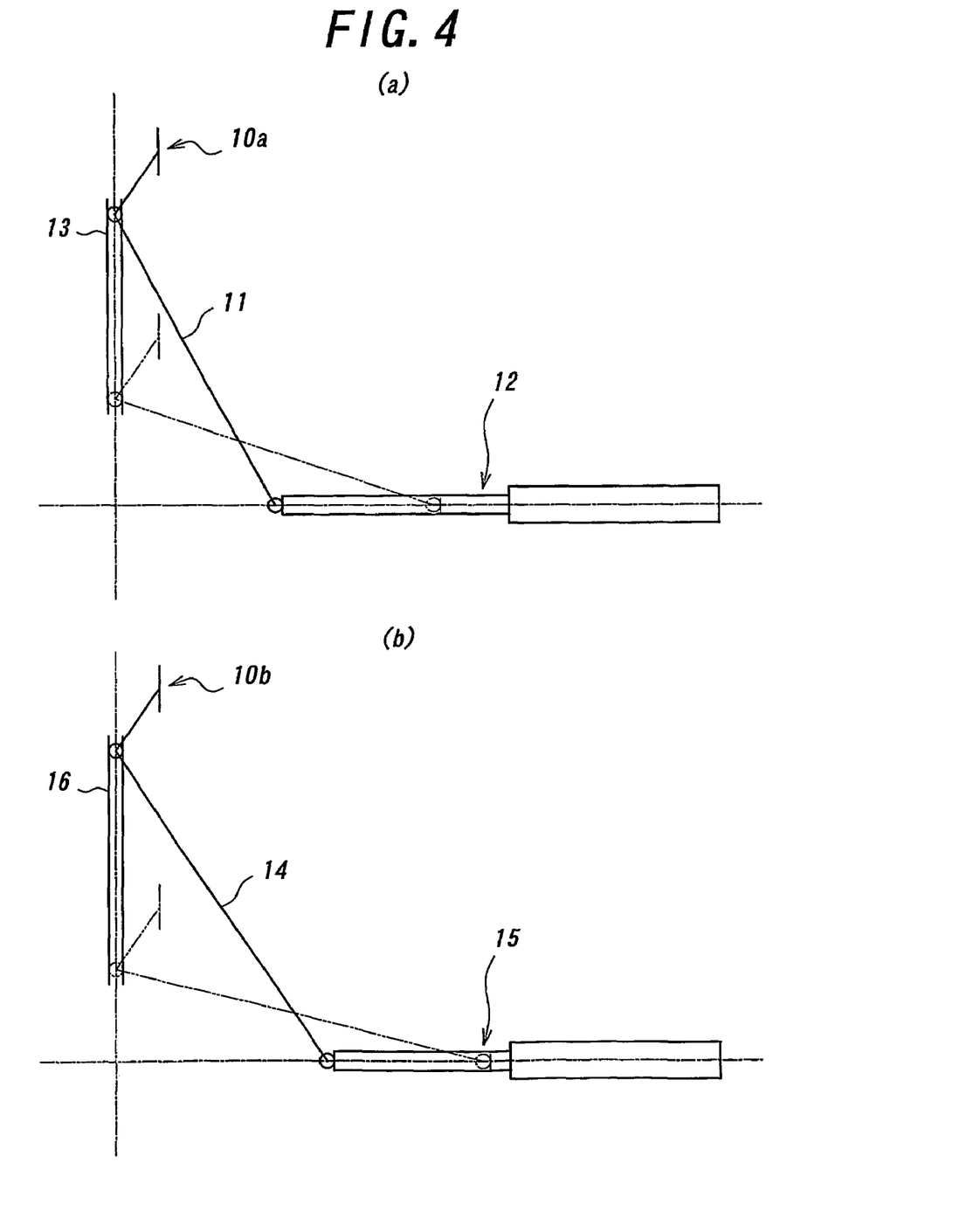
FIG. 4 is a schematic view showing a mechanism of expanding and contracting the diameter of the rigid support member of the tire building drum according to the invention in the radial direction.

FIGS. 4(a) and (b) show mechanisms of expanding and contracting diameters of the rigid support member 10a and the rigid support member 10b, respectively.

The expansion and contraction mechanism of the fan-shaped rigid support member 10a shown in FIG. 4(a) comprises a rigid support member 10a reciprocatedly moving in the radial direction, a link 11 hingedly connected at one end portion to a bracket of the rigid support member 10a, a cylinder 12 hingedly connected to the other end portion of the link 11 and arranged substantially in parallel to a center axial line of the building bladder to reciprocatedly move the other end portion of the link in the direction of the center axial line of the building bladder, and a guide 13 guiding the radial displacement of the rigid support member 10a while maintaining and restraining a vertical posture of the rigid support member 10a to the center axial line. In the figure, a solid line shows a diameter-expanded state of the rigid support member 10a, the link 14 and the cylinder 12, while a phantom line shows a diameter-contracted state of the rigid support member 10a, the link 11 and the cylinder 12.

According to this mechanism, the rigid support member 10a can conduct the diameter-expansion and contraction movement in the radial direction in accordance with the reciprocate movement of the cylinder 12 on the center axial line of the tire building drum.

The expansion and contraction mechanism of the trapezoidal rigid support member 10b shown in FIG. 4(b) comprises a link 14 having a total length longer than that of the link 11, a cylinder 15 having the same stoke amount and a different stroke position, and a guide 16 having a stroke amount larger than that of the guide 13. As a result, the expansion and contraction displacing amount of the trapezoidal rigid support member 10b is made larger than that of the fan-shaped rigid support member 10a.

According to these expansion-contraction mechanisms, distances from the center axial line to outer peripheral faces of the fan-shaped rigid support member 10a and the trapezoidal rigid support member 10b are made the same in the diameter-expansion, whereby these rigid support members 10a, 10b can be alternately aligned in the peripheral direction without space.

On the contrary, the distance from the center axial line to the outer peripheral face of the trapezoidal rigid support member 10b in the diameter-contraction is made smaller than that in the outer peripheral face of the fan-shaped rigid support member 10a based on the difference of the expansion-contraction displacement amount between the rigid support members 10a and 10b as mentioned above, whereby the rigid support members 10b can be aligned at a state of adjoining to each other in the peripheral direction and the rigid support members 10a can be aligned at a state of adjoining to each other at the outer peripheral side thereof.

As seen from FIG. 2, a form of a bead receiving face 17 formed on an outer peripheral face of the bead lock means 7 in the radial direction, directly on each outer peripheral face of the plural arc-shaped elements in a section inclusive of the center axial line of the building bladder 6 is made to a collar form in which a central portion side of the center axial line of the building bladder is large in the diameter and an end portion side thereof is small in the diameter.

In addition, a portion of the radially outer fold bladder 8 located near to the central portion of the center axial line of the building bladder 6 is arranged so as to protrude up to a position covering the whole of the bead receiving face 17. Preferably, this protruded portion is closely fitted onto the bead receiving face 17, whereby an accidental positioning shift of the protruded portion to the bead receiving face 17 is prevented.

Moreover, it is preferable that mutual opposed faces of the arc-shaped elements in the bead lock means 7 adjoining to each other are inclined at an angle of about 45 degrees with respect to a virtual peripheral line segment viewed from the outer peripheral side and have parallel planes in the radial direction. According to this structure, the disconnection of the mutually adjoining arc-shaped elements over their widths in the peripheral direction is completely prevented, whereby the supporting force to the bead core and the carcass band can be enhanced as compared with the case of causing disconnection.

FIG. 5(a) shows a state of transferring the green case onto the building drum 1 through the green case holding and transferring means 4.

Numeral 18 is a transferred green case. This green case 18 is composed mainly of a cylindrical carcass band 19, annular bead cores 20 and bead fillers 21, and further provided with an innerliner 22 press-bonded to an inner peripheral face of the carcass band 19 and sidewall rubbers 23 press-bonded onto both end portions of an inner peripheral face of the innerliner 22 in this embodiment.

FIG. 5(b) shows a locked state of the bead core, in which the bead core 20 in the green case 18 is positioned to the bead receiving face 17 of the bead lock means 7 and then the bead lock means 7 and hence each arc-shaped elements is diameter-expanded in the radial direction to lock the bead core 20 with the bead receiving face 17 under a high restraint force.

FIG. 5(c) is a schematic view illustrating a step of pressing the green case onto a belt-tread band while approaching both the bead cores to each other.

Numeral 24 is a belt-tread band. This belt-tread band is composed mainly of a tread rubber 25 and a belt 26.

The belt-tread band 24 is transferred from the belt-tread shaping drum 3 through the belt-tread band holding and transferring means 5 and positioned and held at a previously determined position of a central portion of the green case 18 at the outer peripheral side thereof.

Under the restraint of the bead core 20 in the green case 18 through the bead lock means 7, the bead cores 20 are approached to each other based on the approaching displacement of the bead lock means 7 to each other and at the same time the central portion of the green case 18 is expansion-deformed by the building bladder 6, whereby the central portion of the green case 18 is pressed onto the inner peripheral face of the belt-tread band 24.

By the way, the form of the bead receiving face 17 of the bead lock means 7 in the section inclusive of the center axial line of the building bladder is made to a collar form in which a central portion side of the center axial line of the building bladder is large in the diameter and an end portion side thereof is small in the diameter as previously mentioned, so that the bead receiving face 17 can develop a restraint force larger than that of the conventional bead receiving face of a flat face against a tensile force applied to the carcass band 19 in the expansion-deformation of the green case 18, whereby the pulling-out of the carcass band cords to the bead core 20 or the falling down of the bead core 20 toward the central portion side of the center axial line of the building bladder 6 due to tensile force applied to the carcass band 19 can be advantageously prevented.

FIG. 5(d) is a schematic view illustrating a step of turning the end of the carcass band around the bead core to form a bead portion.

As shown in the figure, plural rigid support members 10a, 10b are first diameter-expanded outward in the radial direction to place the aforementioned annular plane region D into positions corresponding to the bead core 20 and the bead filler 21. Thereafter, the radially outer fold bladder 8 and the radially inner fold bladder 9 are expansion-deformed by supplying an internal pressure thereinto to turn the end portion of the carcass band 19 around the bead core 20 together with the innerliner 22 and the sidewall rubber 23 to thereby form a bead portion.

In this case, the bead core 20 and the bead filler 21 are strongly supported from the inside thereof by the annular plane region D of the plural rigid support members 10a, 10b having a given width d wider than the radial lengths of the bead core 20 and the bead filler 21 over the whole region in the radial direction.

Therefore, the bead core 20 and the bead filler 21 are strongly sandwiched together with the carcass band 19 by the annular plane region D of the plural rigid support members 10a, 10b and the radially outer fold bladder 8 and the radially inner fold bladder 9, whereby the pressing force of the carcass band 19 to the bead filler 21 is enhanced and hence the residual air between the carcass band 19 and the bead filler 21 is effectively removed.

As a result, the uniformity of the product tire can be enhanced and also the durability can be improved.

Also, the portion of the fold bladder 8 protruded on the bead receiving face 17 is expansion-deformed by supplying an internal pressure to the fold bladder 8, so that the carcass band 19 is pushed into the diameter-expansion direction to the bead core 20 and hence the pressing force of the carcass band 19 to the bead core 20 can be enhanced.

By the series of the above-mentioned steps can be effectively removed the residual air between the bead filler and the carcass band to build a green tire.

Figure 5:
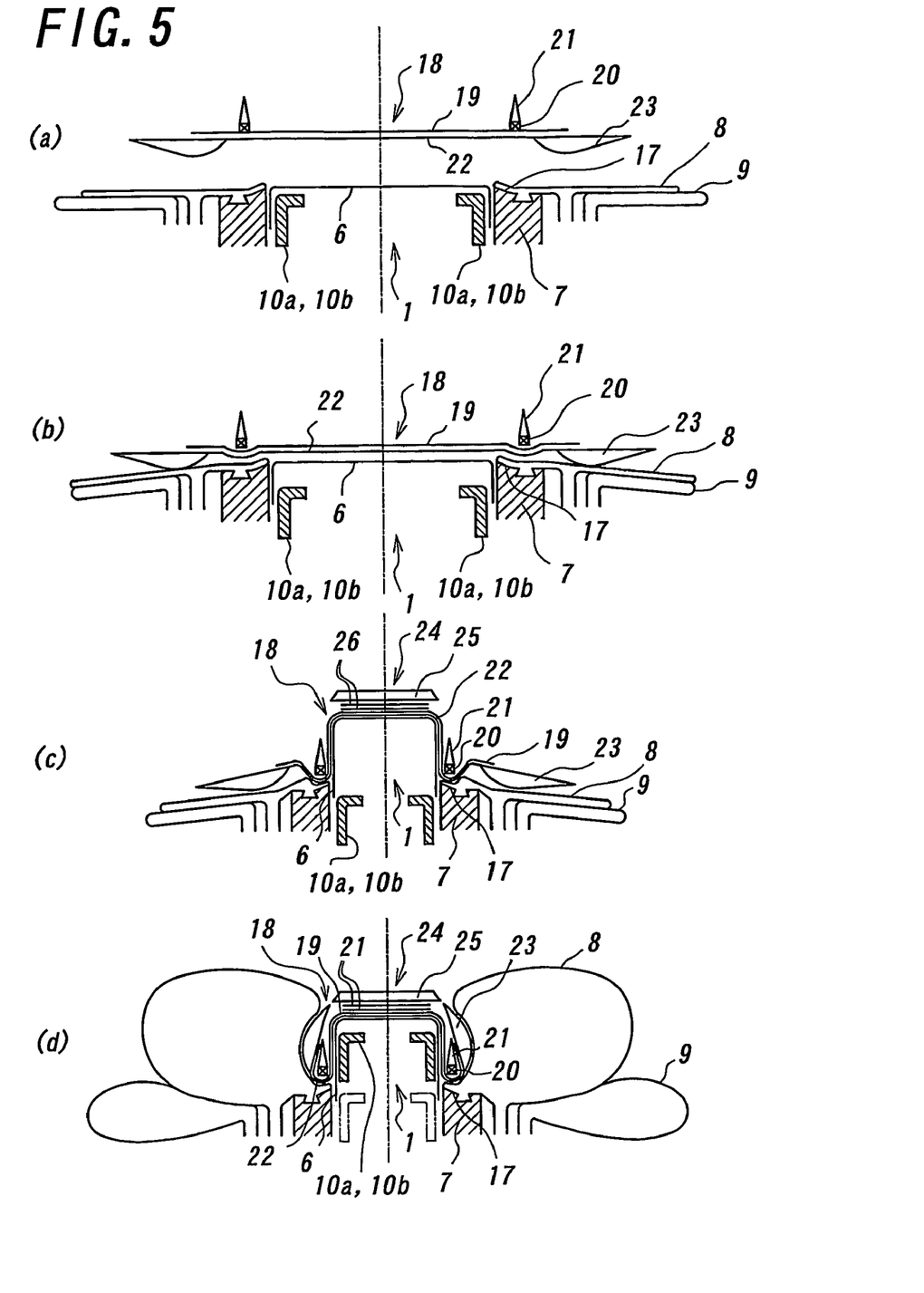
FIG. 5 is a section view schematically illustrating the building step of the tire.

Although FIG. 5 shows a case that the green case is shaped on the carcass band shaping drum separated from the tire building drum, the green case can be shaped by shaping a cylindrical carcass band on the tire building drum and arranging bead cores and bead fillers at the outer peripheral side of the carcass band and the like. In the latter case, when both the end portions of the carcass band are turned around the respective bead cores, the plural rigid support members are functioned in the same manner as mentioned above to strongly support the bead core and the bead filler from the inside thereof, whereby the pressing force of the carcass band to the bead filler can be enhanced, and the residual air between the carcass band and the bead filler can be effectively removed.

Figure 6:
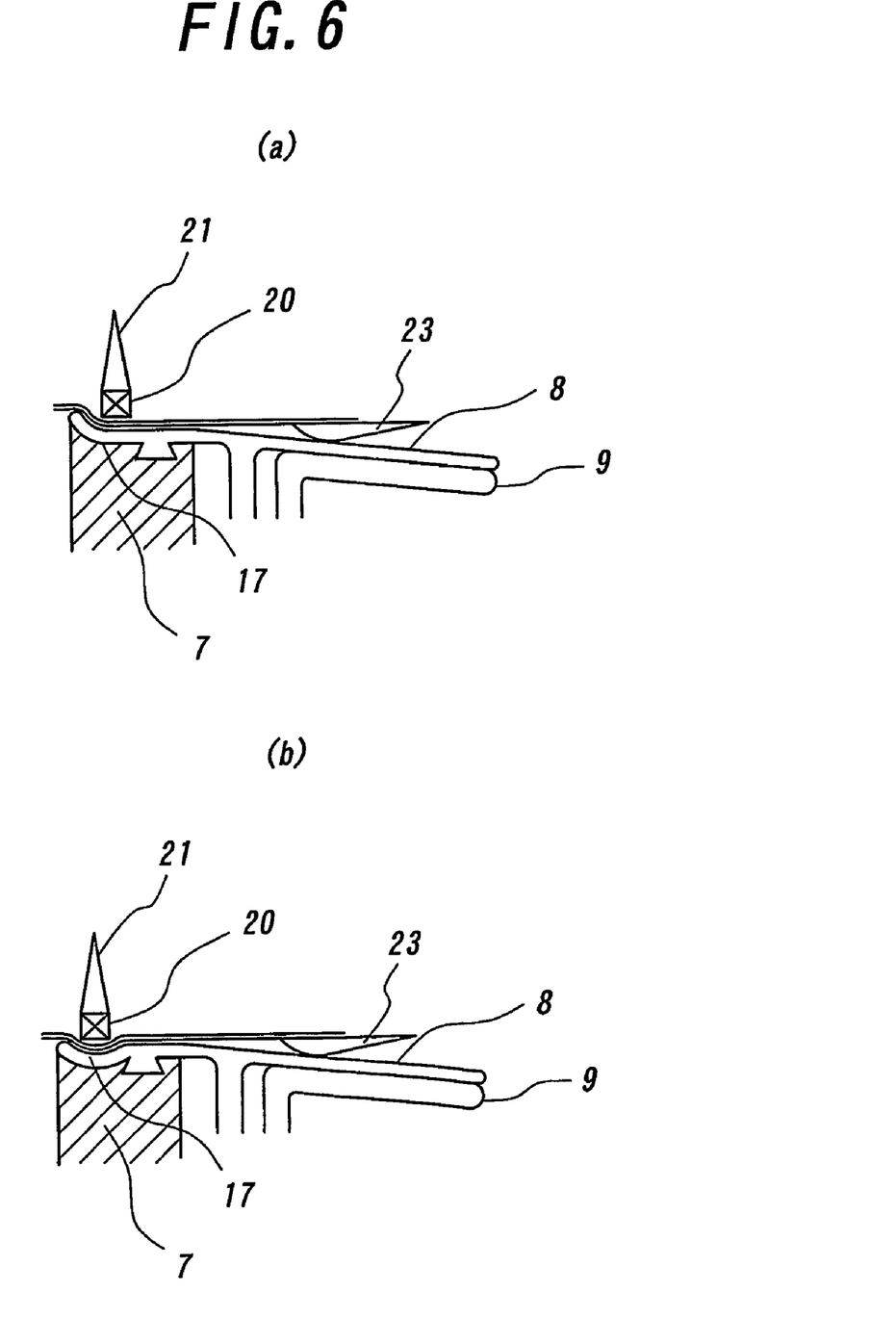
FIG. 6 is a view illustrating a sectional form of a bead lock means in the tire building drum according to the invention.

Moreover, FIGS. 2 and 5 show a case that the bead receiving face 17 has a collar form as shown in detail in FIG. 6(a), but the sectional form of the bead receiving face may be a U-shaped form opening outward in the radial direction as shown in FIG. 6(b). In the latter case, an area of the bead receiving face contacting with the carcass band 19 becomes larger than that of the collar form, so that the restraint force of the bead receiving face to the carcass band cords becomes further strong, and hence the pulling-out of the carcass band cord to the bead core 20 or the falling-down of the bead core 20 can be prevented more effectively.

INDUSTRIAL APPLICABILITY

As seen from the above, according to the invention, when both the end portions of the carcass band are turned around the bead cores after the green case is pressed onto the belt-tread band, the carcass band is pushed onto the rigid support members arranged at the inner peripheral side of the carcass band together with the bead cores and the bead fillers to enhance the pressing force of the carcass band to the bead filler, whereby the residual air between the carcass band and the bead filler can be removed more effectively. Thus, the uniformity of the product tire is held at a good level and the durability of the bead portion is improved.

The invention claimed is:

1. A method of building a tire in which a green case composed mainly of a cylindrical carcass band, annular bead cores and bead fillers is arranged on an outer peripheral side of a tire building drum, and a central portion of the green case is expansion-deformed in a radial direction while approaching both the bead cores to each other under a restraint of the bead cores by the tire building drum, and then the green case is pressed onto an inner peripheral face of a belt-tread band composed mainly of a belt and a tread, and thereafter each end portion of the carcass band is turned around the bead core, wherein the carcass band is pushed onto rigid support members comprising two differently shaped kinds of rigid support members alternately arranged in a peripheral direction without space in at least diameter-expanded posture, arranged inward in an axial direction of the carcass band over a whole of an arranging region of the bead core and the bead filler together therewith in the turning of the carcass band.

2. The method of claim 1, wherein a first one of said two differently shaped kinds of rigid support members has a fan shape, and a second one of said two differently shaped kinds of rigid support members has a trapeziodal shape.

3. The method of claim 2, further comprising expanding and contracting said first one of said rigid support members via a first link hingedly connected at one end portion to a bracket of said first one of said rigid support members, a first cylinder hingedly connected to another end portion of the first link and arranged substantially in parallel to a center axial line of the building drum to reciprocatedly move the other end portion of the first link in the direction of the center axial line of the building drum, and a first guide guiding radial displacement of said first one of said rigid support members while maintaining and restraining a vertical posture of said first one of said rigid support members to the center axial line.

4. The method of claim 3, further comprising expanding and contracting said second one of said rigid support members via a second link hingedly connected at one end portion to a bracket of said second one of said rigid support members, a second cylinder hingedly connected to another end portion of the second link and arranged substantially in parallel to a center axial line of the building drum to reciprocatedly move the other end portion of the second link in the direction of the center axial line of the building drum, and a second guide guiding radial displacement of said second one of said rigid support members while maintaining and restraining a vertical posture of said second one of said rigid support members to the center axial line, wherein said second link has a greater length than said first link.

5. The method of claim 3, wherein a distance from the center axial line to the outer peripheral face of the second one of said rigid support members in a diameter-contracted posture is smaller than that in the outer peripheral face of the first one of said rigid support members.

6. A method of building a tire in which a cylindrical carcass band is shaped on a building drum, and bead cores and bead fillers are arranged on an outer peripheral side of the carcass band to form a green case, and a central portion of the green case is expansion-deformed in a radial direction while approaching both the bead cores to each other under a restraint of the bead core, and the green case is pressed onto an inner peripheral face of a belt-tread band composed mainly of a belt and a tread, and thereafter the carcass band is pushed onto rigid support members comprising two differently shaped kinds of rigid support members alternately arranged in a peripheral direction without space in at least diameter-expanded posture, arranged inward in an axial direction of the carcass band over a whole of an arranging region of the bead core and the bead filler together therewith.

7. The method of claim 6, wherein a first one of said two differently shaped kinds of rigid support members has a fan shape, and a second one of said two differently shaped kinds of rigid support members has a trapezoidal shape.

8. The method of claim 7, further comprising expanding and contracting said first one of said rigid support members via a first link hingedly connected at one end portion to a bracket of said first one of said rigid support members, a first cylinder hingedly connected to another end portion of the first link and arranged substantially in parallel to a center axial line of the building drum to reciprocatedly move the other end portion of the first link in the direction of the center axial line of the building drum, and a first guide guiding radial displacement of said first one of said rigid support members while maintaining and restraining a vertical posture of said first one of said rigid support members to the center axial line.

9. The method of claim 8, further comprising expanding and contracting said second one of said rigid support members via a second link hingedly connected at one end portion to a bracket of said second one of said rigid support members, a second cylinder hingedly connected to another end portion of the second link and arranged substantially in parallel to a center axial line of the building drum to reciprocatedly move the other end portion of the second link in the direction of the center axial line of the building drum, and a second guide guiding radial displacement of said second one of said rigid support members while maintaining and restraining a vertical posture of said second one of said rigid support members to the center axial line, wherein said second link has a greater length than said first link.

10. The method of claim 8, wherein a distance from the center axial line to the outer peripheral face of the second one of said rigid support members in a diameter-contracted posture is smaller than that in the outer peripheral face of the first one of said rigid support members.

11. A tire building drum comprising a building bladder having substantially a cylindrical form and capable of expanding in a radial direction, a pair of bead lock means located adjacent to end portions of the building bladder and movable laterally as well as in a diameter-expansion direction, double fold bladders located adjacent to an outside of each bead lock means and arranged inward and outward in the radial direction, and plural rigid support members comprising two differently shaped kinds of rigid support members alternately arranged in a peripheral direction, arranged inside the building bladder and at a position adjacent to an inside of the bead lock means and movable in diameter expansion and contraction directions in the radial direction in which these members are aligned in a peripheral direction without space in at least diameter-expanded posture and form an annular plane having a given width in the radial direction at a plane perpendicular to a center axial line of the building bladder and crossing thereto.

12. A tire building drum according to claim 11, wherein a width of an annular plane in a radial direction formed at a posture of diameter-expanding the plural rigid support members is made wider than lengths of a bead core and a bead filler in the radial direction.

13. A tire building drum according to claim 12, wherein a bead receiving face at the outer peripheral face of the bead lock means in a section inclusive of a center axial line of the building bladder is rendered into a U-shaped form opening outward in the radial direction or a collar form in which a central portion side of the center axial line is large in the diameter and an end portion side thereof is small in the diameter.

14. A tire building drum according to claim 11, wherein a bead receiving face at the outer peripheral face of the bead lock means in a section inclusive of a center axial line of the building bladder is rendered into a U-shaped form opening outward in the radial direction or a collar form in which a central portion side of the center axial line is large in the diameter and an end portion side thereof is small in the diameter.

15. A tire building drum according to claim 11, wherein a portion of the fold bladder located outward in the radial direction and near to the central portion of the center axial line of the building bladder is arranged so as to protrude up to a position covering the whole of a bead receiving face at the outer peripheral face of the bead lock means in a section inclusive of a center axial line of the building bladder.

16. A tire building drum according to claim 11, which is provided with an expansion and contraction mechanism comprising said two differently shaped kinds of rigid support members alternately arranged in a peripheral direction, a link hingedly connected at one end portion to each of the rigid support members, a cylinder hingedly connected to the other end portion of the link and arranged so as to reciprocatedly move the other end portion of the link in a direction of a center axial line of a building drum, and a guide mechanism limiting a direction of expansion and contraction displacement of the rigid support member in the radial direction.

17. The tire building drum of claim 11, wherein a first one of said two differently shaped kinds of rigid support members has a fan shape, and a second one of said two differently shaped kinds of rigid support members has a trapezoidal shape.

18. The tire building drum of claim 17, further comprising expanding and contracting said first one of said rigid support members via a first link hingedly connected at one end portion to a bracket of said first one of said rigid support members, a first cylinder hingedly connected to another end portion of the first link and arranged substantially in parallel to a center axial line of the building bladder to reciprocatedly move the other end portion of the first link in the direction of the center axial line of the building bladder, and a first guide guiding radial displacement of said first one of said rigid support members while maintaining and restraining a vertical posture of said first one of said rigid support members to the center axial line.

19. The tire building drum of claim 18, further comprising expanding and contracting said second one of said rigid support members via a second link hingedly connected at one end portion to a bracket of said second one of said rigid support members, a second cylinder hingedly connected to another end portion of the second link and arranged substantially in parallel to a center axial line of the building bladder to reciprocatedly move the other end portion of the second link in the direction of the center axial line of the building bladder, and a second guide guiding radial displacement of said second one of said rigid support members while maintaining and restraining a vertical posture of said second one of said rigid support members to the center axial line, wherein said second link has a greater length than said first link.

20. The tire building drum of claim 18, wherein a distance from the center axial line to the outer peripheral face of the second one of said rigid support members in a diameter-contracted posture is smaller than that in the outer peripheral face of the first one of said rigid support members.

* * * * *